US010964988B2

(12) United States Patent
Fernandez-Galindo et al.

(10) Patent No.: US 10,964,988 B2
(45) Date of Patent: Mar. 30, 2021

(54) FUSIBLE BIMETALLIC BUS BARS FOR BATTERY ARRAYS

(71) Applicant: FORD GLOBAL TECHNOLOGIES, LLC, Dearborn, MI (US)

(72) Inventors: Francisco Fernandez-Galindo, Canton, MI (US); Daniel Paul Roberts, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 201 days.

(21) Appl. No.: 16/153,897

(22) Filed: Oct. 8, 2018

(65) Prior Publication Data

US 2020/0112012 A1 Apr. 9, 2020

(51) Int. Cl.
*H01M 50/502* (2021.01)
*H01M 10/0525* (2010.01)
*H01M 10/647* (2014.01)
*H01B 1/02* (2006.01)
*H01M 50/20* (2021.01)
*H01M 50/528* (2021.01)
*H01M 50/543* (2021.01)
*H01M 50/581* (2021.01)

(52) U.S. Cl.
CPC .......... *H01M 50/502* (2021.01); *H01B 1/026* (2013.01); *H01M 10/0525* (2013.01); *H01M 10/647* (2015.04); *H01M 50/20* (2021.01); *H01M 50/528* (2021.01); *H01M 50/543* (2021.01); *H01M 50/581* (2021.01); *H01M 2200/103* (2013.01); *H01M 2220/20* (2013.01)

(58) Field of Classification Search
None
See application file for complete search history.

(56) References Cited

U.S. PATENT DOCUMENTS

| 6,377,432 B1* | 4/2002 | Hashimoto | ............ H01H 85/36 361/103 |
| --- | --- | --- | --- |
| 8,409,744 B2 | 4/2013 | Ijaz et al. | |
| 9,028,986 B2 | 5/2015 | Ijaz et al. | |
| 9,287,547 B2 | 3/2016 | Widhalm | |
| 2013/0306353 A1 | 11/2013 | Zhao | |
| 2016/0093863 A1 | 3/2016 | DeKeuster et al. | |
| 2018/0159096 A1* | 6/2018 | Kim | ....................... H01M 2/305 |
| 2020/0168887 A1* | 5/2020 | Yoo | ....................... H01M 2/206 |

OTHER PUBLICATIONS

Oxford English Dictionary definition of notch. Accessed at: <<https://www.oed.com/view/Entry/128536?rskey=7hZRcd&result=1&isAdvanced=false#eid>> on Nov. 3, 2020 (Year: 2020).*

* cited by examiner

*Primary Examiner* — Alix E Eggerding
(74) *Attorney, Agent, or Firm* — David B. Kelley; Carlson, Gaskey & Olds

(57) ABSTRACT

This disclosure details exemplary battery pack designs for use in electrified vehicles. Exemplary battery arrays that may be incorporated into electrified vehicle battery packs may include a grouping of battery cells and a circuit connector module configured for electrically connecting the grouping of battery cells. The circuit connector module may include a first bus bar made of a single material and a second bus bar that is fusible and made of at least two dissimilar materials.

20 Claims, 7 Drawing Sheets

FUSIBLE BIMETALLIC BUS BARS FOR BATTERY ARRAYS

TECHNICAL FIELD

This disclosure relates to electrified vehicle battery packs, and more particularly to battery array circuit connector modules that include fusible bimetallic bus bars.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells. The battery cells must be reliably connected to one another in order to achieve the necessary voltage and power levels for operating the electrified vehicle. Numerous parts, including but not limited to bus bars, wiring, and sensors, are typically required to electrically connect the battery cells.

SUMMARY

A battery array according to an exemplary aspect of the present disclosure includes, among other things, a grouping of battery cells and a circuit connector module configured for electrically connecting the grouping of battery cells. The circuit connector module includes a first bus bar comprised of a single material and a second bus bar that is fusible and comprised of at least two dissimilar materials.

In a further non-limiting embodiment of the foregoing battery array, the grouping of battery cells includes lithium-ion pouch cells or lithium-ion prismatic cells.

In a further non-limiting embodiment of either of the foregoing battery arrays, the circuit connector module includes a carrier for housing the first bus bar and the second bus bar.

In a further non-limiting embodiment of any of the foregoing battery arrays, the circuit connector module includes a cover attachable to the carrier.

In a further non-limiting embodiment of any of the foregoing battery arrays, the single material of the first bus bar includes copper, brass, or aluminum.

In a further non-limiting embodiment of any of the foregoing battery arrays, the at least two dissimilar materials include copper and aluminum.

In a further non-limiting embodiment of any of the foregoing battery arrays, the at least two dissimilar materials include a first material having a first melting point and a second material having a second melting point that is lower than the first melting point.

In a further non-limiting embodiment of any of the foregoing battery arrays, the second bus bar includes a first section made of a first material, a second section made of a second material, and a third section made of the first material.

In a further non-limiting embodiment of any of the foregoing battery arrays, the first section is an elongated bar attached to a terminal of one cell of the grouping of battery cells, the third section is a flat tab that receives a terminal stud, and the second section connects between the first section and the third section.

In a further non-limiting embodiment of any of the foregoing battery arrays, the second section includes a notch that establishes a fuse link of the second bus bar.

In a further non-limiting embodiment of any of the foregoing battery arrays, the second bus bar includes a notch that establishes a fuse link.

In a further non-limiting embodiment of any of the foregoing battery arrays, the fuse link is located within a low melting point section of the second bus bar.

In a further non-limiting embodiment of any of the foregoing battery arrays, the second bus bar includes an upper portion comprised of a first material and a lower portion comprised of a second material. The second material includes a lower melting point compared to the first material.

In a further non-limiting embodiment of any of the foregoing battery arrays, the lower portion includes a notch that establishes a fuse link.

In a further non-limiting embodiment of any of the foregoing battery arrays, the at least two dissimilar materials include a first material connected to a second material by a dovetail connection.

A method according to another exemplary aspect of the present disclosure includes, among other things, electrically connecting a grouping of battery cells with a circuit connector module. The circuit connector module includes a first bus bar comprised of a single material and a second bus bar that is fusible and comprised of at least two dissimilar materials.

In a further non-limiting embodiment of the foregoing method, the single material includes cooper, brass, or aluminum, and the at least two dissimilar materials include copper and aluminum.

In a further non-limiting embodiment of either of the foregoing methods, the first bus bar is connected to a first terminal of a first battery cell of the grouping of battery cells, and the second bus bar is connected to a second terminal of a second battery cell of the grouping of battery cells and receives a terminal stud.

In a further non-limiting embodiment of any of the foregoing methods, the second bus bar includes a fuse link, and the second bus bar may sever at the fuse link in response to a short circuit event.

In a further non-limiting embodiment of any of the foregoing methods, the at least two dissimilar materials include a first material and a second material that are joined at a dovetail connection via a clad metal process.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for use in electrified vehicles. Exemplary battery arrays that may be incorporated into electrified vehicle battery packs may include a grouping of battery cells and a circuit connector module configured for electrically connecting the grouping of battery cells. The circuit connector module may include a first bus bar made of a single material and a second bus bar that is fusible and made of at least two dissimilar materials. These and other features are discussed in greater detail in the following paragraphs of this detailed description.

Figure 1:
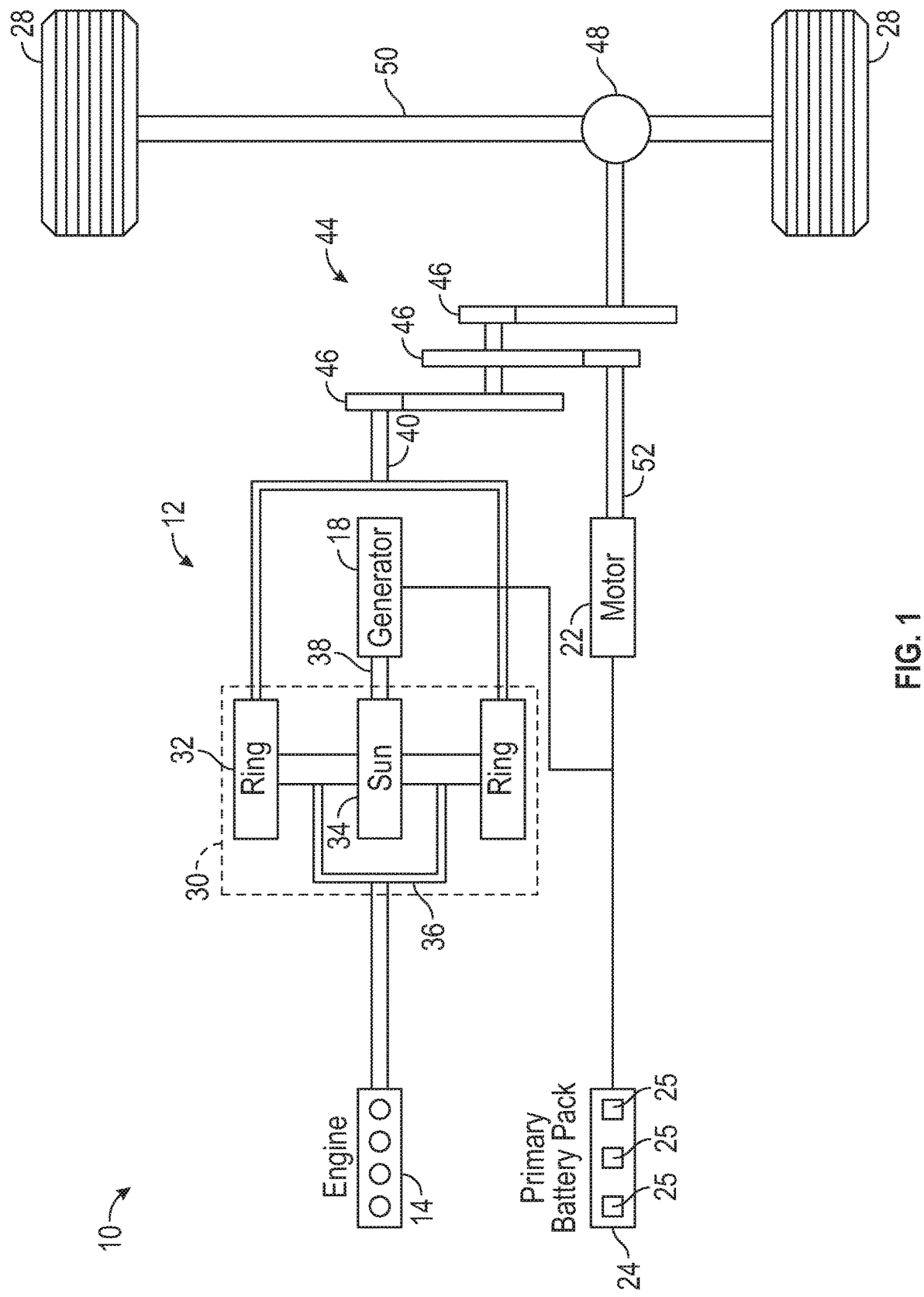
FIG. 1 schematically illustrates a powertrain of an electrified vehicle.

FIG. 1 schematically illustrates a powertrain 10 of an electrified vehicle 12. In an embodiment, the powertrain 10 is a powertrain of a hybrid electric vehicle (HEV). However, although depicted in an embodiment as a HEV, the concepts described herein could extend to other electrified vehicles, including, but not limited to, plug-in hybrid electric vehicles (PHEV's), battery electric vehicles (BEV's), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes one or more battery arrays 25 (i.e., battery assemblies or groupings of battery cells) housed inside an enclosure assembly 27. The battery arrays 25 are capable of outputting electrical power to operate the motor 22, the generator 18, and/or other electrical loads of the electrified vehicle 12. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
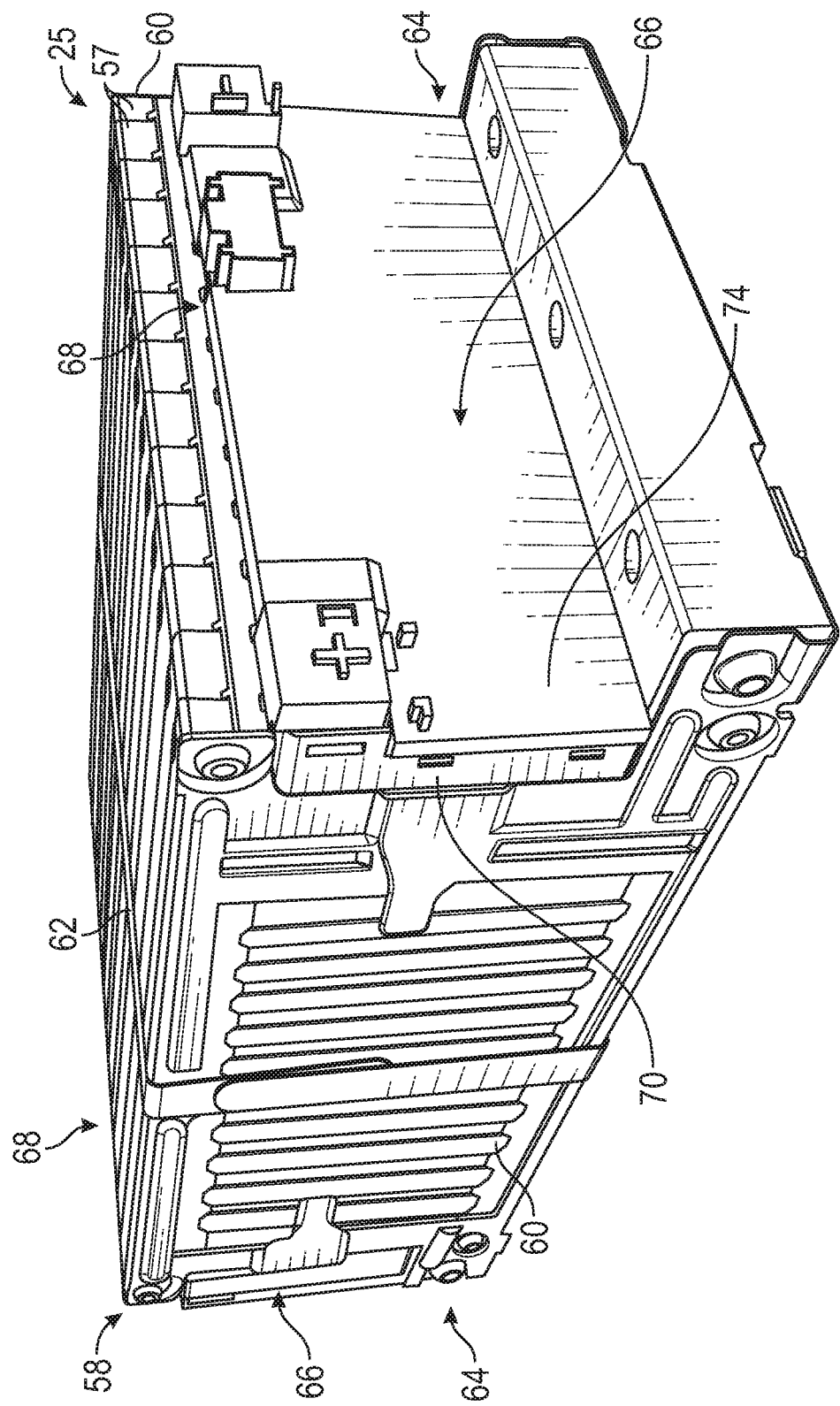
FIGS. 2 and 3 illustrate a battery array for an electrified vehicle battery pack.
Figure 3:
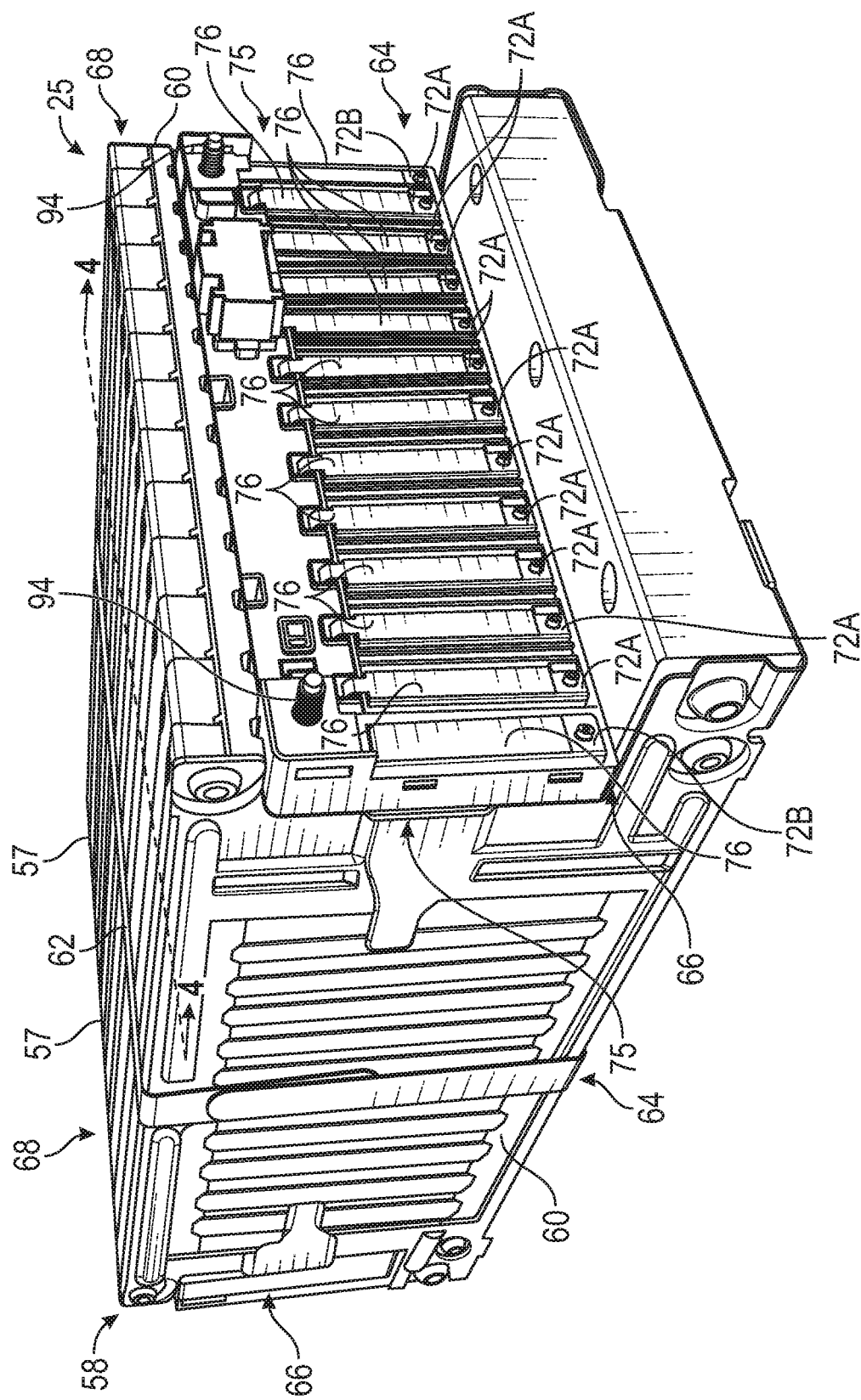
Figure 4:
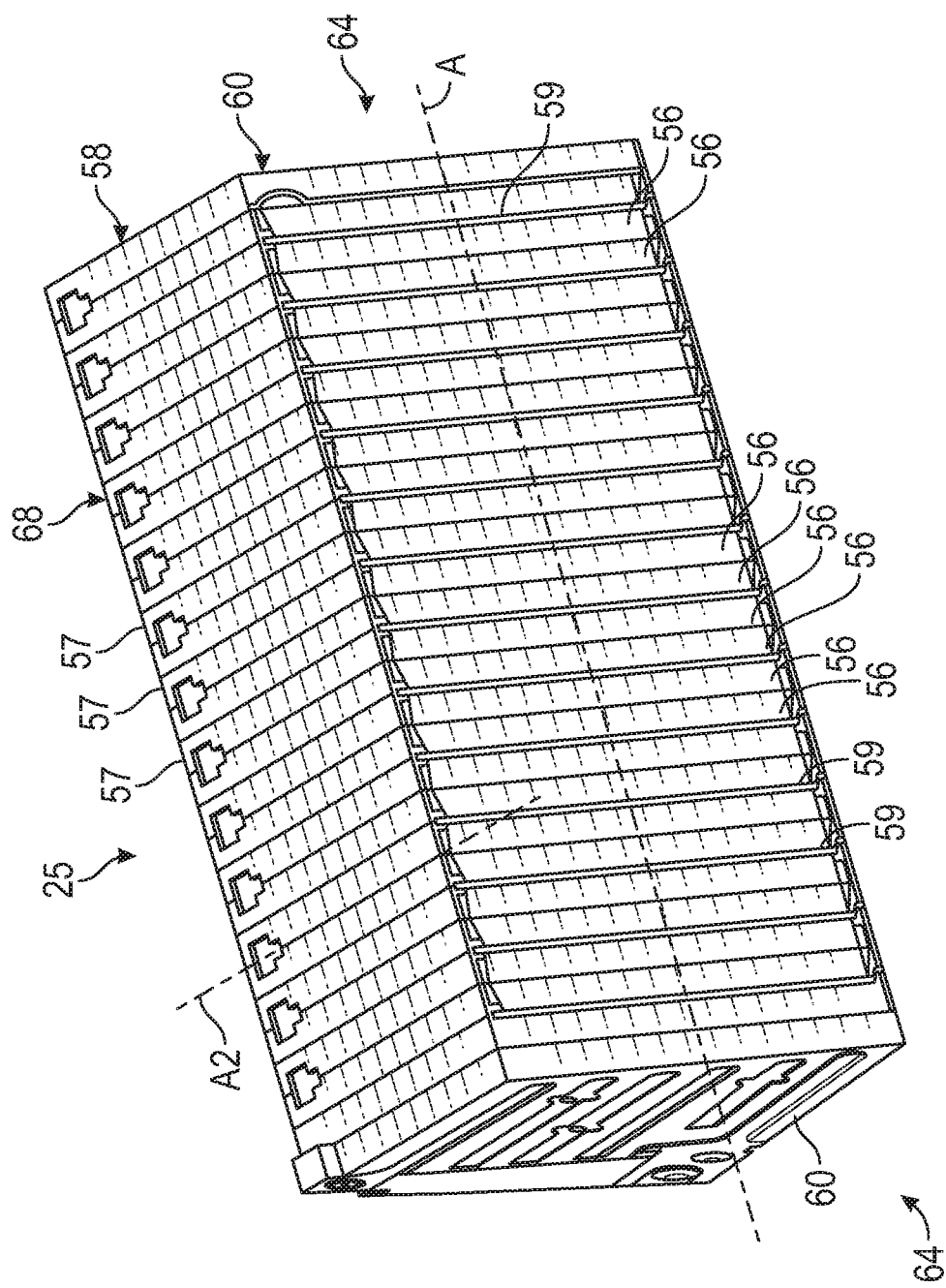
FIG. 4 is a cross-sectional view through section 4-4 of the battery array of FIG. 3.

FIGS. 2, 3, and 4 illustrate a battery array 25 that can be employed within an electrified vehicle. For example, the battery array 25 could be a component of the battery pack 24 of the electrified vehicle 12 shown in FIG. 1. The battery array 25 could be packaged along with one or more additional battery arrays inside the enclosure assembly 27 of the battery pack 24 of FIG. 1.

The battery array 25 includes a plurality of battery cells 56 (best seen in the cross-sectional view of FIG. 4) that store energy for powering various electrical loads of the electrified vehicle 12. Although a specific number of battery cells are depicted in FIGS. 2-4, the battery array 25 could employ a greater or fewer number of cells within the scope of this disclosure. In other words, this disclosure is not limited to the specific configuration shown in the exemplary figures.

The battery cells 56 may be stacked side-by-side along a stack axis A (see FIG. 4) to construct a grouping of battery cells 56, sometimes referred to as a "cell stack." In an embodiment, the battery cells 56 are lithium-ion pouch cells. However, battery cells having other geometries (cylindrical, prismatic, etc.), other chemistries (nickel-metal hydride, lead-acid, etc.), or both, could alternatively be utilized within the scope of this disclosure.

The battery cells 56 may be held within array frames 57. Each array frame 57, for example, may hold one or more battery cells 56. In an embodiment, the array frames 57 are plastic components that hold two battery cells 56. In another embodiment, a thermal fin 59 (see FIG. 4) is also held by the array frames 57. The thermal fins 59 can be positioned between adjacent battery cells 56 of the cell stack to thermally manage any heat generated by the battery cells 56.

The battery cells 56 of the battery array 25 may additionally be supported by a support structure 58 disposed around an outer perimeter of the cell stack. In an embodiment, the support structure 58 includes one or more array plates 60 and one or more bindings 62. Together, the array plates 60 and the bindings 62 axially constrain the battery cells 56 and array frames 57 in the stacked configuration. The total number of array plates 60 and bindings 62 utilized within each battery array 25 is design specific and may depend on the amount of stiffness that is necessary to maintain relatively consistent battery array dimensions.

In an embodiment, the battery array 25 includes two array plates 60 disposed at each longitudinal extent 64 of the battery array 25. In this embodiment, the array plates 60 act as end plates of the support structure 58 that extend in parallel with longitudinal axes A2 (see FIG. 4) of the battery cells 56. However, other configurations are also contemplated, and this disclosure is not limited to the specific array configuration shown in FIGS. 2-4.

The battery array 25 may additionally include one or more circuit connector modules 66 that are configured for electrically connecting the battery cells 56. The battery cells 56 may be connected in either a series string or a parallel string. The circuit connector modules 66 could be snap fit, welded, bolted, clipped, or otherwise attached to one or more of the battery cells 56 or support structures (e.g., the array frames 57) of each battery array 25.

In an embodiment, one circuit connector module 66 is mounted to the array frames 57 at each opposing side 68 of each battery array 25. However, other mounting locations are also contemplated. Together, the circuit connector modules 66 may establish a system for electrically connecting the battery cells 56 of each battery array 25 of the battery pack 24.

In the illustrated embodiment, where the battery cells 56 are pouch style battery cells, each circuit connector module 66 may be referred to as an interconnected bus bar (ICB) module. In another embodiment, where the battery cells 56 are prismatic style battery cells, each circuit connector module 66 may be referred to as a bus bar module (BBM).

Each circuit connector module 66 may include a carrier 70, a first type of bus bars 72A housed within the carrier 70, a second type of bus bars 72B housed within the carrier 70, and a cover 74. The cover 74 is shown in FIG. 2 but is removed in FIG. 3 to better illustrate the carrier 70 and the enclosed bus bars 72A, 72B.

The carrier 70 may be a tray-like device for receiving and retaining the bus bars 72A, 72B. The cover 74 may be secured to the carrier 70 in any known manner for housing the bus bars 72A, 72B and any other relatively sensitive components of the circuit connector module 66. In an embodiment, the cover 74 is snapped (e.g., clipped) into the carrier 70 to conceal the bus bars 72A, 72B.

In another embodiment, the carrier 70 and the cover 74 are both plastic components. However, other materials could also be used to construct the carrier 70 and/or the cover 74.

Figure 5:
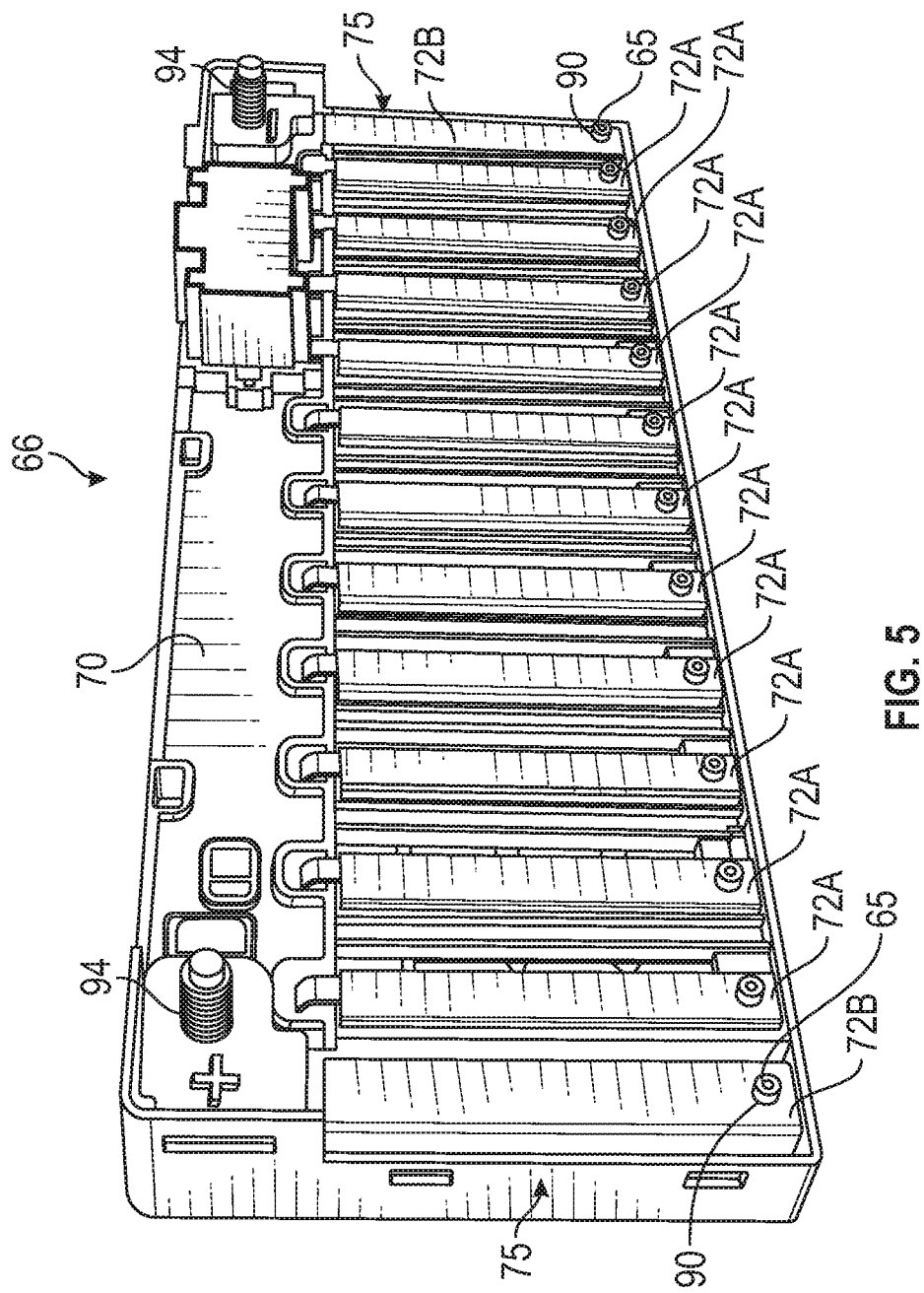
FIG. 5 illustrates a circuit connector module of the battery array of FIGS. 2-3.

Referring now primarily to FIGS. 3 and 5, the circuit connector module 66 may include two different types of bus bars—the first type of bus bars 72A and the second type of bus bars 72B. The first type of bus bars 72A may each be connected to a terminal 76 (see FIG. 3), sometimes referred to as a cell tab, of one of the battery cells 56 for electrically connecting adjacent battery cells 56 of the battery array 25. The bus bars 72A may be relatively thin strips of metal that are configured to conduct the power stored by the battery cells 56. The bus bars 72A may be capable of carrying relatively high amperage capacities.

In an embodiment, the first type of bus bars 72A are made of a single material. For example, the bus bars 72A could be made from copper, brass, or aluminum. Other materials are also contemplated within the scope of this disclosure.

One of the second type of bus bars 72B may be positioned at each opposing end 75 of the carrier 70 for establishing a high voltage positive connector (+) and a high voltage negative connector (−), respectively, of the battery array 25. Thus, in an embodiment, the circuit connector module 66 includes two of the second type of bus bars 72B. However, the total amounts of the first and second types of bus bars 72A, 72B provided within the carrier 70 is not intended to limit this disclosure. In an embodiment, each of the bus bars 72A are located axially between the bus bars 72B within the carrier 70.

The bus bars 72B may each be connected to a terminal 76 of one of the battery cells 56. The bus bars 72B may also be capable of carrying relatively high amperage capacities. The bus bars 72B may facilitate the connection of the battery array 25 to any adjacent battery arrays of the battery pack 24.

In an embodiment, the second type of bus bars 72B are fusible bus bars that are made of at least two dissimilar materials (e.g., bimetallic bus bars) for protecting the individual battery array 25 from damage and cell venting. For example, the bus bars 72B could be made from a combination of copper and aluminum materials. Other materials are also contemplated within the scope of this disclosure. Exemplary designs of the second type of bus bars 72B are further detailed below.

Figure 6:
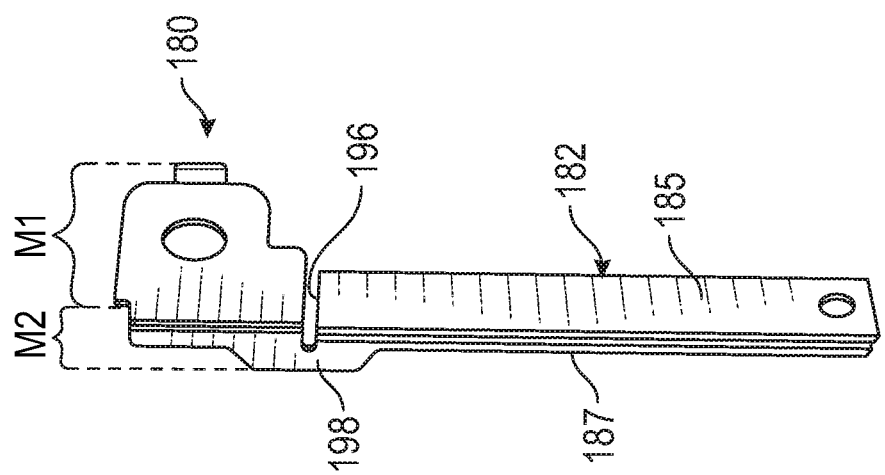
FIG. 6 illustrates an exemplary fusible bimetallic bus bar for a circuit connector module of a battery array.

FIG. 6 illustrates an exemplary fusible bimetallic bus bar 80. The fusible bimetallic bus bar 80 could be employed as the second type of bus bar 72B within the circuit connector module 66 of FIGS. 3 and 5.

The fusible bimetallic bus bar 80 may include a body 82 made of at least two dissimilar materials. In an embodiment, the body 82 is made of both copper and aluminum. However, other dissimilar materials are also contemplated within the scope of this disclosure. In another embodiment, the body 82 is generally L-shaped. However, other shapes and configurations are also contemplated within the scope of this disclosure.

The body 82 may include a first section 84 made of a first material M1 (e.g., copper), a second section 86 made of a second material M2 (e.g., aluminum), and a third section 88 made of the first material M1 (e.g., copper). In an embodiment, the first section 84 may be configured as an elongated bar, the third section 88 may be configured as a relatively flat tab, and the second section 86 may be configured as a transition area that connects between the first section 84 and the third section 88.

The first section 84 establishes a connection surface 85 for connecting a terminal 76 (shown schematically using dashed lines) of a battery cell 56 to the fusible bimetallic bus bar 80. The first section 84 of the body 82 may additionally include a first opening 90 for connecting the fusible bimetallic bus bar 80 to another component, such as a heat stake post 65 of a circuit board of the circuit connector module 66.

The third section 88 of the body 82 may include a second opening 92. The second opening 92 is sized to accommodate a terminal stud 94 (shown in FIG. 5) for connecting the battery array 25 to an adjacent battery array of the battery pack 24.

The second section 86 of the body 82 may protrude outwardly from each of the first section 84 and the third section 88. In an embodiment, the second section 86 includes a notch 96. The notch 96 establishes a fuse link 98 of the fusible bimetallic bus bar 80.

In the event of a relatively high current event (e.g., a short circuit event), the fusible bimetallic bus bar 80 may sever (e.g., melt) at the fuse link 98 to break the circuit, thereby electrically disabling the battery array 25 for protection. For example, the second material M2 of the second section 86 may include a melting temperature (e.g., 1,221° F./660.3° C. for aluminum) that is lower than a melting temperature (e.g., 1,984° F./1,085° C. for copper) of the first material M1 of the first and third sections 84, 88. Therefore, the fuse link 98 of the second section 86 will melt relatively quickly during the short circuit event, whereas the first and third sections 84, 88 will not melt by virtue of their higher melting points. Since the first and third sections 84, 88 do not melt, less molten material is produced during the fusing event. The fusible bimetallic bus bar 80 therefore provide more reliable and safer fusing capabilities as compared to existing bus bar designs.

Figure 7:
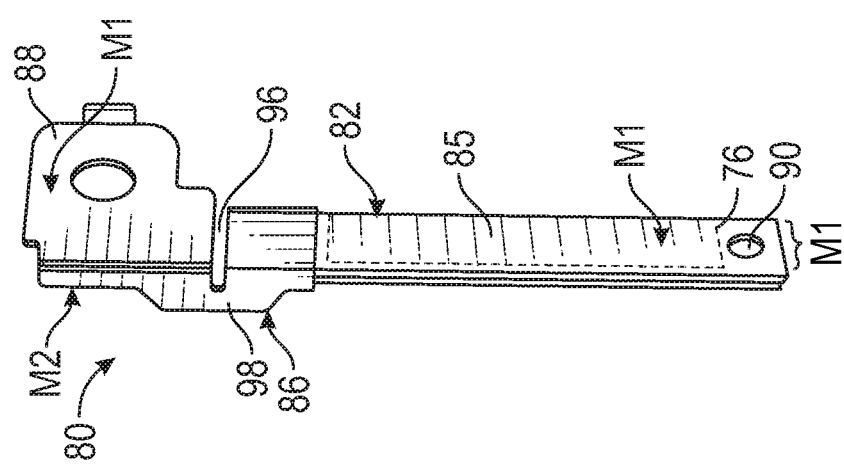
FIG. 7 illustrates another exemplary fusible bimetallic bus bar for a circuit connector module of a battery array.

FIG. 7 illustrates another exemplary fusible bimetallic bus bar 180. The fusible bimetallic bus bar 180 could be employed as the second type of bus bar 72B within the exemplary circuit connector modules 66 of FIGS. 3 and 5.

The fusible bimetallic bus bar 180 is similar to the fusible bimetallic bus bar 80 of FIG. 6. However, in this embodiment, the distribution between and arrangement of the first material M1 and the second material M2 is slightly different for constructing a body 182 of the fusible bimetallic bus bar 180. For example, the body 182 may include an upper portion 185 and a lower portion 187. Once received within the carrier 70 of the circuit connector module 66, the upper portion 185 faces away from the carrier 70 and the lower portion 187 faces toward the carrier 70 (e.g., toward the battery cells 56).

In an embodiment, the upper portion 185 is made entirely of the first material M1 (e.g., copper), and the lower portion 187 is made entirely of the second material M2 (e.g., aluminum). Together, the upper portion 185 and the lower portion 187 establish the body 182 of the fusible bimetallic bus bar 180.

The body 182 includes a notch 196 that establishes a fuse link 198 of the fusible bimetallic bus bar 180. The notch 196 may extend into both the upper portion 185 and the lower portion 187. The fuse link 198 may be located in the lower portion 187 of the body 182 and is therefore made of the second material M2, which has a lower melting point than the first material M1. Accordingly, in the event of a relatively high current event (e.g., a short circuit event), the fusible bimetallic bus bar 180 may sever (e.g., melt) at the fuse link 198 to break the circuit, thereby electrically disabling the battery array 25.

Figure 8:
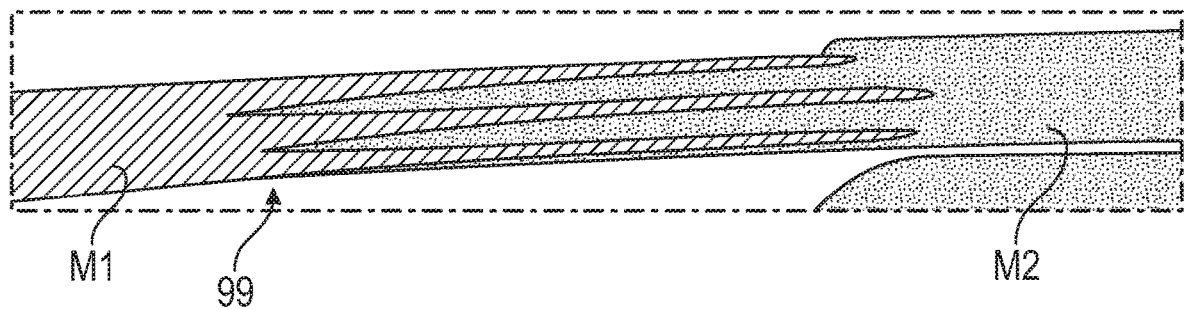
FIG. 8 schematically illustrates a clad metal process for joining components made from dissimilar metallic materials.

FIG. 8 schematically illustrates a clad metal process for joining two dissimilar materials M1 and M2. The first material M1 and the second material M2 may be joined together during the clad metal process using a combination of heat and pressure. The image of FIG. 8 is shown at 1000× magnification in order to better illustrate a dovetail connection 99 that is formed between the first and second materials M1, M2 during the clad metal process. A similar dovetail connection could be used to create multiple transitions (e.g., copper to aluminum to copper) in the fusible bimetallic bus bars of this disclosure.

The exemplary battery arrays of this disclosure incorporate fusible bimetallic bus bars within the array circuit connector modules. The fusible bimetallic bus bars include fuse links that are located in a lower melting point area of the bimetallic bus bar body structures. The bus bars are therefore designed to quickly sever at the fuse link in order to break the circuit and electrically disable the battery array. The possibility of cell damage is reduced because the higher melting point areas do not produce molten material during the fusing event. Short circuit regulation compliance can thereby be ensured for the battery arrays of a battery pack under all conditions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery array, comprising:
 a grouping of battery cells; and
 a circuit connector module configured for electrically connecting the grouping of battery cells and comprising:
  a first bus bar comprised of a single material; and
  a second bus bar that is fusible and comprised of at least two dissimilar materials,
  wherein a notch is formed in a low melting point section of the second bus bar,
  wherein the notch extends from a first edge of the lower melting point section and across a portion of a width of the lower melting point section, and further wherein the notch terminates prior to a second edge that is opposite from the first edge of the lower melting point section.

2. The battery array as recited in claim 1, wherein the grouping of battery cells includes lithium-ion pouch cells or lithium-ion prismatic cells.

3. The battery array as recited in claim 1, wherein the circuit connector module includes a carrier for housing the first bus bar and the second bus bar, and further wherein the circuit connector module includes a cover attachable to the carrier.

4. The battery array as recited in claim 1, wherein the single material of the first bus bar includes copper, brass, or aluminum.

5. The battery array as recited in claim 1, wherein the at least two dissimilar materials include copper and aluminum.

6. The battery array as recited in claim 1, wherein the at least two dissimilar materials include a first material having a first melting point and a second material having a second melting point that is lower than the first melting point.

7. The battery array as recited in claim 1, wherein the second bus bar includes a first section made of a first material, a second section made of a second material, and a third section made of the first material.

8. The battery array as recited in claim 7, wherein the first section is an elongated bar attached to a terminal of one cell of the grouping of battery cells, the third section is a flat tab that receives a terminal stud, and the second section connects between the first section and the third section.

9. The battery array as recited in claim 8, wherein the second section includes the notch, and the notch establishes a fuse link of the second bus bar.

10. The battery array as recited in claim 1, wherein the notch establishes a fuse link located within the low melting point section of the second bus bar.

11. The battery array as recited in claim 1, wherein the second bus bar includes an upper portion comprised of a first material and a lower portion comprised of a second material, wherein the second material includes the lower melting point section.

12. The battery array as recited in claim 11, wherein the lower portion includes the notch that establishes a fuse link.

13. The battery array as recited in claim 1, wherein the at least two dissimilar materials include a first material connected to a second material by a dovetail connection.

14. The battery array as recited in claim 1, wherein the lower melting point section connects between a first higher melting point section and a second higher melting point section of the second bus bar, and further wherein the second edge protrudes outwardly relative to both the first higher melting point section and the second higher melting point section.

15. The battery array as recited in claim 1, wherein the notch extends into both an upper portion and a lower portion of the second bus bar, and the lower portion faces toward the grouping of battery cells and the upper portion faces away from the grouping of battery cells once received within a carrier of the circuit connector module, and further wherein the lower melting point section is part of the lower portion but not the upper portion of the second bus bar.

16. A method, comprising:
  electrically connecting a grouping of battery cells with a circuit connector module,
  wherein the circuit connector module includes a first bus bar comprised of a single material and a second bus bar that is fusible and comprised of at least two dissimilar materials,
  wherein a notch is formed in a low melting point section of the second bus bar,
  wherein the notch extends from a first edge of the lower melting point section and across a portion of a width of the lower melting point section, and further wherein the notch terminates prior to a second edge that is opposite from the first edge of the lower melting point section.

17. The method as recited in claim 16, wherein the single material includes copper, brass, or aluminum, and the at least two dissimilar materials include copper and aluminum.

18. The method as recited in claim 16, wherein the first bus bar is connected to a first terminal of a first battery cell of the grouping of battery cells, and the second bus bar is connected to a second terminal of a second battery cell of the grouping of battery cells and receives a terminal stud.

19. The method as recited in claim 16, wherein the second bus bar includes a fuse link established by the notch, and the method comprises:
  severing the second bus bar at the fuse link in response to a short circuit event.

20. The method as recited in claim 16, wherein the at least two dissimilar materials include a first material and a second material that are joined at a dovetail connection via a clad metal process.

* * * * *